United States Patent Office 3,093,766
Patented June 11, 1963

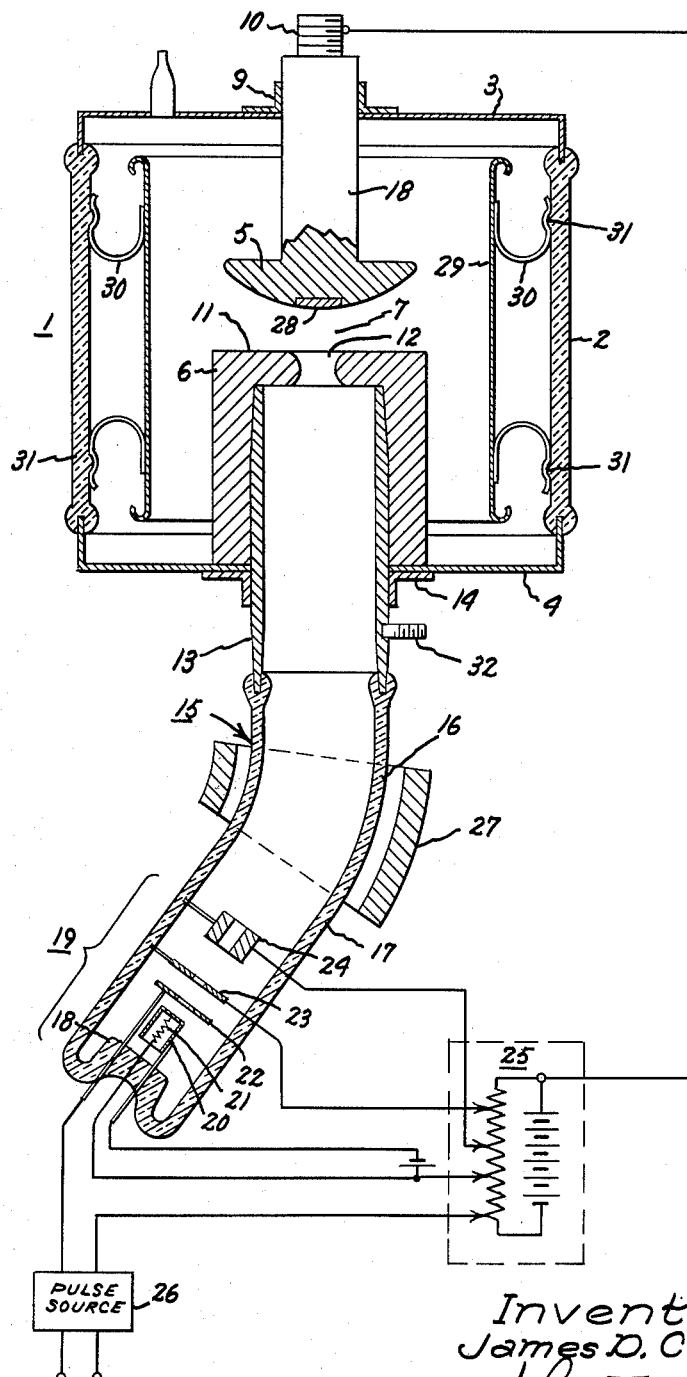
Inventor:
James D. Cobine,
by
His Attorney.

3,093,766
GAS GENERATING ELECTRIC DISCHARGE DEVICE
James D. Cobine, Rexford, N.Y., assignor to General Electric Company, a corporation of New York
Filed May 10, 1961, Ser. No. 109,090
5 Claims. (Cl. 313—174)

The present invention relates to electric discharge devices adapted to switch high voltages and currents with speed and precision, and more particularly to such apparatus in which switching is accomplished by triggering electric breakdown between a pair of fixed electrodes separated by a gap in vacuo.

Gap switching devices are devices normally maintained in an open circuit condition which, when subjected to an appropriate signal, are switched to a closed circuit condition and pass electric current therethrough. Such devices are used to great advantage as overload protectors, lightning arresters and for the precision switching of extremely high voltages and currents, as for example, in discharging capacitor banks to obtain a very short pulse of extremely high current.

For these uses, gap discharge devices must be able to withstand high voltages and to break down or fire only when desired. They must be adapted, for many applications, to repeatedly fire, often thousands of times, in response to essentially the same breakdown conditions, with the same firing time. In other applications, as for example, when used as lightning arresters, it is imperative that such gap devices have an extremely short recovery time so as to be ready to function again a short time after firing.

Most prior art gaps discharge devices are charged with a gaseous atmosphere, often at super-atmospheric pressure. Although suitable for many applications, gaseous gap discharge devices usually have long recovery times, due to the necessity of ionized gases therein becoming deionized before full recovery is effected. Additionally, since the hold-off voltage of a gap discharge device is dependent upon the dielectric strength of the gas therein, gaseous gaps are often quite large when designed for use at high voltages.

Perhaps the greatest disadvantage of sealed gaseous gap discharge devices, however, is due to the fact that with use, gas is removed or "cleaned-up" from the device by entrapment with deposited metallic particles which are sputtered from the electrodes of the gap. This "clean-up" changes the characteristic of the gap so that it does not perform reproducibly and the device must often be replaced long before actual failure.

Vacuum gap discharge devices have been proposed as a means to overcome many of these disadvantages. In theory, a vacuum gap discharge device would be smaller, due to the high dielectric strength of a vacuum; its recovery time would be much shorter; and, since there is no gas to be removed by sputtered metallic particles, a vacuum gap should not change its operating characteristics. In practice, however, prior art vacuum gap discharge devices have not proven to be reliable, either as to firing voltage, hold-off strength, or recovery time. In prior art vacuum spark gap devices, the operating characteristics seem to be a function of the device's past history, such as the time lapse since last firing.

It is a general object of the present invention to provide gap discharge devices which overcome one or more of the foregoing disadvantages.

A more specific advantage of the invention is to provide triggered vacuum gap discharge devices adapted to reproducibly fire at preselected voltage conditions, and to rapidly recover to the prefiring condition.

Another object of the present invention is to provide gap discharge devices operated entirely under vacuum discharge with reproducibly short firing times.

A further object of the invention is to provide improved gap discharge devices having stable, reproducible hold-off voltages, firing times and recovery times in which switching is initiated by an electron beam.

Still another object of the present invention is to provide improved gap discharge devices which are reliable in operation and which may be readily and inexpensively manufactured.

Briefly stated, in accord with one embodiment of the invention I provide a triggered vacuum gap discharge device having an enclosed envelope evacuated to a hard vacuum and including therein a pair of primary electrodes in spaced-apart relation defining a breakdown gap. Means are provided for directing a stream of high energy electrons into said gap to cause breakdown thereof upon a predetermined signal. In accord with a preferred embodiment of the invention, the cathode rays are directed to a portion of one of the primary elecetrodes which is impregnated with ionizable gas. Bombardment of this portion by electrons releases ionized gas which further facilitates breakdown of the gap.

The novel features believed characteristic of the invention are set forth in the appended claims. The invention itself, together with further objects and advantages thereof may be best understood by reference to the following description, taken in connection with the appended drawing in which the sole FIGURE is a vertical cross-sectional view of a triggered vacuum gap device constructed in accord with the invention.

In the drawing, a triggered vacuum gap discharge device in accord with the present invention includes an evacuable envelope represented generally as 1 comprising a cylindrical insulating side wall member 2 and a pair of oppositely disposed apertured end wall members 3 and 4. A first primary electrode 5 and a second primary electrode 6 are disposed in spaced-apart relation within envelope 1 to define a breakdown gap 7. First primary electrode 5 is mounted upon electrode support member 8 which passes through an aperture in and is hermetically sealed to end wall member 3 by an annular flange 9 and terminates in a threaded stud 10 to facilitate making electrical contact thereto. Second primary electrode 6 is hollow and terminates in a nearly closed end portion 11 having an aperture 12 in the center thereof. Electrode 6 is mounted upon and electrically connected to a hollow electrode support cylinder member 13 which extends through an aperture in end wall member 4 and is hermetically sealed thereto by means of an annular flange 14. A tubular base member 15 is hermetically sealed to the exterior edge of cylindrical member 13. Base member 15 may be conveniently constucted of an insulating glass and includes a first curved portion 16 and a second straight portion 17 which terminates in a re-entrant base press 18. Portion 17 contains an electron gun represented generally by 19 including the usual elements of a cathode 20, cathode heater 21, control electrode 22, accelerating electrode 23 and focusing electrode 24. Each of the above electrodes is suspended in proper alignment by appropriate pins and leads which are passed through or into the walls of portion 19 of tube 15 and which are connected to appropriate potentials by means of a power source represented generally by 25 and including a battery and a voltage divider. Control electrode 22 is connected to the negative portion of the power supply through a pulsed source 26 which is adapted to, upon appropriate signal, allow the passage of an electron beam therethrough, as is conventional. Electrode 5 is connected to the positive side of the voltage divider so as to attract a beam of electrons generated by electron gun 19 thereto. A sector magnet 27 is located surrounding the curved portion 16 of tube 15 and is adapted to provide a traverse magnetic field of sufficient magnitude to bend a beam of electrons emitted electron gun 19 to cause the beam to pass with registry through aperture 12 in electrode 6 so that it may impinge upon region 28 of primary electrode 5.

Electrodes 5 and 6 are surrounded by a ferruled shield having a cylindrical configuration, the purpose of which is to prevent metallic particles evolved from the electrodes during arcing from depositing out on the interior surface of side wall member 2 to render it conducting and short circuit the electrodes. Shield 29 rides upon a plurality of springs 30 which ride upon ridges 31 on the interior surface of side wall member 2.

Electrodes 5 and 6 are constructed of gas-free material, preferably copper, having less than $10^{-6}$ parts by weight of non-condensable gases or compounds which upon dissociation may form non-condensable gases. For this purity, these electrodes should be able to pass a test of being placed in a closed chamber a few liters in volume and deeply eroded by repeated arcing with a voltage of commercial power frequency and magnitude with currents 100 amperes or more. A few cycles after such arcing, the pressure in the test chamber must not rise above the initial pressure, even when the initial pressure is as low as $10^{-5}$ mm. of mercury or lower. Electrode support members 8 and 13 and end wall members 3 and 4 need not meet this criteria for gas freedom since they are not subjected to the direct action of an electric arc. They should, however, be constructed of materials which will not evolve gases when heated to temperatures of, for example 600° C., and may be conveniently outgassed. Conveniently, metallic members of this nature may be oxygen-free copper or stainless steel.

Cylindrical side wall member 2 may be conveniently constructed of a hard glass such as Pyrex or Vycor as may tube 15. Alternatively, ceramic-to-metal disc seal techniques may be utilized in which case an insulating ceramic such as Coors V200 or American Lava T164 or a forsterite ceramic may be used. If ceramic is utilized, a material which may be readily sealed thereto to form an hermetic seal, as for example titanium, may be utilized.

In the operation of the triggered vacuum gap discharge device of the invention a voltage to be switched, or if the device is to be utilized as a circuit protective device, the equipment to be protected is connected between studs 10 on electrode support 8 and 32 on electrode support member 13. The cathode gun 19 is connected to power source 25 and a suitable control is applied to pulse source 26. The applied voltage between the main electrodes establishes an electric field within gap 7 which is insufficient to cause the breakdown thereof. However, upon a predetermined signal or at a predetermined time, pulse source 26 is activated to modify the negative voltage upon control electrode 23 of electron gun 19, permitting a stream of electrons to flow from cathode gun 19 through tube 15, cylindrical electrode support 13, aperture 12 in electrode 6 and to impinge upon target region 29 of electrode 5. The presence of the electrons constituting the pulsed beam within gap 7 may be sufficient to cause breakdown thereof. However, if the energy of the electron beams are sufficiently high, electrons and ions may be ejected from region 28 of cathode 5 to fill gap 7 with conduction carriers.

In a preferred embodiment of the invention, region 28 is composed of an insert of a material of, for example titanium or zirconium, which has active gas-gettering characteristics and which may be charged with a large quantity of an ionizable gas, as for example hydrogen. Under these circumstances, when a pulsed electron beam impinges upon region 28, the heating effect of the electrons is sufficient to cause the evolution gas which immediately becomes ionized to fill gap 7 with a burst of conduction carriers to cause instantaneous breakdown of gap 7. Upon the breakdown of gap 7, high currents are conducted between electrodes 5 and 6, the limitation to current being in the external load or resistance.

Current is conducted between these electrodes so long as the potential difference exists therebetween. Upon the disappearance of such a potential difference, the arc established therebetween is extinguished. Upon extinction of the arc, the conduction carriers in the gap which are primarily, metallic ions and electrons evolved from the electrodes, either recombine or diffuse to shield 29, the electrodes or other adjacent members of the device, are cooled and deionized. Any gases which were evolved from target area 28 on electrode 5 are rapidly gettered thereby upon extinction of the arc, so that the pressure within the device in the region of gap 7 rapidly and almost instantaneously falls to the hard vacuum existing therein prior to breakdown. With the high dielectric strength of the vacuum, and in the absence of a pulsed signal from electron gun 19, the device now remains non-conducting and may withstand very high voltages in the kilovolt range without breaking down.

In the device specifically illustrated in the drawing, the cathode gun 19 is located at an angle to the longitudinal axis of electrodes 5 and 6, in order to prevent the elements thereof becoming coated and contaminated with the material evolved from the electrodes during arcing therebetween. It is not imperative that the exact configuration illustrated in the drawing be utilized as a matter of fact, if relatively few arcings are to be sustained by the device, the cathode gun could be incorporated directly in line with the gap, as for example, within cylinder 13. Likewise, it is not critical or imperative that the cathode gun be located so as to direct electrons directly upon surface 28 of electrode 5 through aperture 12 in electrode 6. Alternatively, a stream of electrons could be directed transversely into gap 7 substantially perpendicular to the longitudinal axis drawn through contacts 5 and 6 and suitable permanent magnets could be utilized in the electrodes to cause the electrons to be deflected to region 29 or a similar region which serves the same purpose. Alternatively, the density of electron projected into the gap may be made sufficiently high so that only the electrons are relied upon to cause the breakdown of gap 7. In this case, the electrons need not even collide with region 28 or any similar region upon one of the electrodes to cause the emission of secondary electrons, ions or ionized gas particles.

The devices constructed in accord with the present invention are readily adapted to switch, with substantially no time delay, high voltages at high current ratings and to recover therefrom with microsecond speed, with little deviation from the standard recovery time, to a condition of high dielectric strengths, so that repetitive arcing and breakdown cycles may be followed, as for example, when the device is utilized as a lightning arrester.

While the invention has been set forth herein in accord with certain specific embodiments thereof many modifications and changes will readily occur to those skilled in the art. Accordingly, I intend by the appended claims to cover all such modifications and changes as fall within the true spirit and scope of the invention.

What I claim as new and desire to secure by Letters Patent of the United States is:

1. An electric discharge device adapted to change from a non-conducting condition to a conducting condition in response to a pulsed signal and comprising: an evacuable envelope evacuated to a hard vacuum; a pair of primary electrodes located within said envelope and spaced apart from one another to define a breakdown gap therebetween; means for connecting a voltage to said electrodes to cause an electric field to exist within said gap; a cathode gun positioned within said envelope and adapted to direct a stream of electrons into said gap and upon a target area on one of said primary electrodes in response to a pulsed signal; and means for applying a pulsed signal to said cathode gun to cause electrons to be directed into said gap to render the device conducting.

2. An electric discharge device adapted to change from a non-conducting condition to a conducting condition in response to a pulsed signal and comprising: an evacuable envelope evacuated to a hard vacuum; a first primary electrode and an apertured second primary electrode spaced apart from one another in said envelope to define a breakdown gap therebetween; means for connecting a voltage to said electrodes to cause an electric field to exist within said gap; a cathode gun positioned within said envelope and adapted to direct a stream of electrons through the aperture in said second primary electrode into said gap and upon a target area on said first primary electrode in response to a pulsed signal; and means for applying a pulsed signal to said cathode gun to cause electrons to be directed into said gap to render said device conducting.

3. An electric discharge device adapted to change from a nonconducting condition to a conducting condition in response to a pulsed signal and comprising: an evacuable envelope evacuated to a hard vacuum; a first primary electrode and a second apertured primary electrode spaced apart from one another within said envelope to define a breakdown gap therebetween; said first primary electrode having a target area upon the face thereof substantially opposite the aperture in said second primary electrode which comprises a material having active gas-gettering properties and adapted to store, under conditions consistent with the maintenance of a hard vacuum within said envelope, a quantity of an ionizable gas; means for connecting voltage to said primary electrodes to cause an electric field to exist within said gap; a cathode gun positioned within said envelope and adapted to direct a stream of electrons through the aperture in said second primary electrode into said gap and upon the target area on said first primary electrode in response to a pulsed signal to said cathode gun to cause electrons to be directed into said gap to render the device conducting.

4. The device of claim 3 wherein said target area is charged with a quantity of ionizable gas.

5. An electric discharge device adapted to change from a non-conducting condition to a conducting condition in response to a pulsed signal and comprising: an evacuable envelope evacuated to a hard vacuum; a first primary electrode and a second apertured primary electrode spaced apart from one another within said envelope to define a breakdown gap therebetween; means for connecting a voltage to said primary electrodes to cause an electric field to exist within said gap; a base member integrally connected with said envelope and associated with said second primary electrode, said base member comprising a hollow tube having a curved portion and a straight portion; a cathode gun located within said straight portion and including means to form and collimate a stream of electrons; magnetic means located adjacent said curved portion for deflecting a beam of electrons formed by said cathode gun so as to be in registry with the aperture in said second primary electrode; and means associated with said cathode gun for supplying a pulsed signal to said cathode gun to cause a pulse of electrons to be injected into said gap to render said gap conducting.

References Cited in the file of this patent

UNITED STATES PATENTS

| 2,036,069 | Morrison | Mar. 31, 1936 |
| 2,137,528 | Farnsworth | Nov. 22, 1938 |

FOREIGN PATENTS

| 820,970 | France | Aug. 9, 1937 |